United States Patent Office 3,057,885
Patented Oct. 9, 1962

3,057,885
3,17-BISOXYGENATED 16,16-DIHALOESTRA-1,3,5(10)-TRIENES
Arthur H. Goldkamp, Glencoe, Ill., assignor to G. D. Searle & Co., Chicago, Ill., a corporation of Delaware
No Drawing. Filed Sept. 29, 1959, Ser. No. 843,058
8 Claims. (Cl. 260—397.4)

The present invention relates to novel 16,16-dihalosteroids and, more particularly, to 3,17-bisoxygenated 16,16-dihaloestra-1,3,5(10)-trienes of the structural formula

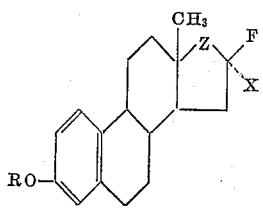

wherein R is selected from the group consisting of hydrogen, lower alkyl, and lower alkanoyl radicals; X is a halogen atom having an atomic weight of less than 100; and Z is selected from the group consisting of carbonyl, β-hydroxymethylene, β-(lower alkanoyl)oxymethylene, α-(lower alkyl)-β-hydroxymethylene, and α-(lower alkyl)-β-(lower alkanoyl)oxymethylene radicals.

Lower alkyl radicals encompassed by R and Z are exemplified by methyl, ethyl, propyl, butyl, pentyl, hexyl, and the branched-chain isomers thereof. The term "lower alkanoyl" comprehends, for example, formyl, acetyl, propionyl, butyryl, valeryl, caproyl, and the branched-chain isomers thereof, said groups being the acyl radicals of alkanoic acids containing fewer than 7 carbon atoms.

An additional feature of this invention is a novel process for the preparation of the instant 16,16-difluoro compounds. Materials suitable for the manufacture of these 16,16-difluoro compounds are the lower alkyl ethers of estrone. A member of the latter class of compounds is converted to an "enamine" derivative, as characterized by the following partial structural formula:

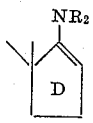

wherein the —NR₂ moiety represents the residue of a secondary amine selected from the group consisting of alkyl, aralkyl, and heterocycloaliphatic secondary amines. Preferred amines are, for example, pyrrolidine, piperidine, and pipecolines. The reaction mixture containing this "enamine" is then treated with perchloryl fluoride to produce the difluoro compound. As a specific example of this novel process, estrone 3-methyl ether is heated with excess 4-methylpiperidine in the presence of a catalytic quantity of p-toluenesulfonic acid, then perchloryl fluoride passed into the reaction mixture, typically at 0–25°, resulting in 16,16-difluoro-3-methoxyestra-1,3,5(10)-trien-17-one. Alternatively, the "enamine" can be isolated and treated with perchloryl fluoride, preferably in the presence of a suitable acid acceptor such as pyridine, triethylamine, etc.

Reduction of the aforementioned difluoroketones, preferably with sodium borohydride in aqueous ethanol, affords the corresponding alcohols. For example, reaction of 16,16-difluoro-3-methoxyestra-1,3,5(10)-trien-17-one with sodium borohydride in aqueous ethanol results in 16,16-difluoro-3-methoxyestra-1,3,5(10)-trien-17β-ol.

The 3-hydroxy compounds of this invention are preferably obtained from the instant 16,16-difluoro-3-methoxyestra-1,3,5(10)-trien-17-one by cleavage of the ether moiety, for example with hydrogen bromide. The 16,16-difluoro-3-hydroxyestra-1,3,5(10)-trien-17-one thus obtained can be converted to the succeeding instant 3-hydroxy compounds by the procedures described for the etherified derivatives. The reaction of these 3-hydroxy derivatives with a lower alkanoic acid anhydride in pyridine results in the 3-(lower alkanoates) of this invention.

Suitable starting materials for the preparation of the mixed dihalo compounds designated by the structural formula supra are the lower alkyl ethers of 16-fluoroestrone. Treatment of 16-fluoroestrone-3-methyl ether, for example, with isopropenyl acetate in the presence of p-toluene-sulfonic acid to form the intermediate enol acetate, followed by reaction with bromine results in 16α-bromo-16β-fluoro-3-methoxyestra-1,3,5(10)-trien-17-one.

The addition of a 1-alkyne to the carbonyl group of the aforementioned dihaloketones results in the corresponding 17α-alkynyl-17β-ols. Catalytic hydrogenation of the latter acetylenic compounds affords the 17α-(lower alkyl)-17β-ols of this invention. For example, 16,16-difluoro-3-methoxyestra-1,3,5(10)-trien-17-one is treated with acetylene in a lithium-liquid ammonia mixture to yield 17α-ethynyl-16,16-difluoro-3-methoxyestra-1,3,5(10)-trien-17β-ol. Hydrogenation of the latter compound with a palladium-carbon catalyst affords 17α-ethyl-16,16-difluoro-3-methoxyestra-1,3,5(10)-trien-17β-ol.

The instant 17α-(lower alkyl)-17β-ols can be prepared also by reaction of the aforementioned 16,16-dihaloketones with the appropriate alkyllithium reagent. As a specific example of this process, methyllithium is allowed to react with 16,16-difluoro-3-methoxyestra-1,3,5(10)-trien-17-one to yield 16,16-difluoro-3-methoxy-17α-methylestra-1,3,5(10)-trien-17β-ol.

The 17β-(lower alkanoyloxy) compounds of this invention are preferably prepared by reaction of the instant 17β-ols with a lower alkanoic acid anhydride in pyridine. For instance, 16,16-difluoro-3-methoxyestra-1,3,5(10)-trien-17β-ol is treated with acetic anhydride and pyridine to afford 17β-acetoxy-16,16-difluoro-3-methoxyestra-1,3,5(10)-triene.

The compounds of this invention are useful as result of their valuable pharmacological properties. They have, for example, the capacity to decrease the serum cholesterol/phospholipid ratio without at the same time producing the potent feminizing side-effects characteristic of known estrogens adapted to regulation of cholesterol metabolism.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

A mixture of 3.54 parts of estrone enol acetate 3-n-propyl ether, 2.5 parts of N-iodosuccinimide, and 5 parts of dioxane is heated under nitrogen with stirring at about 80° for about 2 hours. The mixture is treated successively with methanol, excess aqueous potassium iodide, and aqueous sodium thiosulfate; and the resulting precipitate collected by filtration. Recrystallization from methanol affords pure 16-iodostrone 3-n-propyl ether.

A solution of 5 parts of 16-iodoestrone 3-n-propyl ether in acetonitrile is refluxed for about 16 hours in a Soxhlet apparatus containing 25 parts of silver fluoride.

The reaction mixture is filtered to remove silver salts, and the filtrate diluted with chloroform, washed with water, dried over anhydrous magnesium sulfate, and evaporated to dryness in vacuo. The residue is adsorbed on magnesiated silica, eluted with benzene-hexane mixtures, and recrystallized from ethanol to afford 16-fluoroestrone 3-n-propyl ether.

*Example 2*

A mixture of 10 parts of estrone 3-methyl ether, 15 parts of 4-pipecoline, and 1.5 parts of p-toluene-sulfonic acid monohydrate is heated at reflux in an apparatus including a water separator filled with xylene. After about 2½ hours, the separator is removed, 90 parts of xylene added, and the mixture distilled to remove the residual water and most of the excess 4-pipecoline. The reaction mixture is cooled to 0–5°, 40 parts of dry benzene added, and gaseous perchloryl fluoride passed into the stirred mixture for about 20 minutes. Excess dilute hydrochloric acid is added to this mixture while it is purged with nitrogen. The organic layer is separated, washed successively with aqueous sodium bicarbonate and aqueous potassium hydroxide, dried over anhydrous sodium sulfate, and concentrated to a small volume. The residue is adsorbed on a silica gel chromatographic column, and the column eluted with hexane-benzene mixtures and finally with benzene alone. The 75% benzene-25% hexane and benzene eluates are combined, evaporated to dryness, and the residue recrystallized from methylene chloride-methanol to afford pure 16,16-difluoro-3-methoxyestra-1,3,5(10)-trien-17-one, M.P. 129–131°; $[\alpha]_D = +166°$ (chloroform).

By substituting an equivalent quantity of estrone 3-n-butyl ether and otherwise proceeding according to the herein described processes, 3-n-butoxy-16,16-difluoroestra-1,3,5(10)-trien-17-one is obtained.

*Example 3*

A mixture of 16,16-difluoroestrone methyl ether, 30 parts of glacial acetic acid, and 30 parts of 48% aqueous hydrobromic acid is heated at reflux under nitrogen for about one hour. The reaction mixture is diluted with water and extracted with chloroform. The organic layer is dried over anhydrous sodium sulfate, then distilled in vacuo to remove the organic solvents. The residue is dissolved in chloroform and this solution extracted with 5% aqueous potassium hydroxide to obtain the phenol. This alkaline extract is then acidified cautiously with aqueous hydrochloric acid and extracted with chloroform. The chloroform solution is dried over anhydrous sodium sulfate and evaporated to dryness in vacuo. Adsorption of the residue on silica gel followed by elution with ethyl acetate-benzene mixtures affords 16,16-difluoroestrone, which displays infrared maxima at 2.70 and 5.61 microns.

*Example 4*

A mixture of 2 parts of 16,16-difluoroestrone, 20 parts of acetic anhydride and 40 parts of pyridine is allowed to stand at room temperature for about 16 hours, then diluted with water. The resulting mixture is extracted with ether and the organic extract washed successively with aqueous sodium bicarbonate and water, dried over anhydrous sodium sulfate and evaporated to dryness to afford 3-acetoxy-16,16-difluoroestra-1,3,5(10)-trien-17-one.

Substitution of an equivalent quantity of n-butyric anhydride in the instant process results in 3-n-butyroxy-16,16-difluoroestra-1,3,5(10)-trien-17-one.

*Example 5*

To a solution of 4 parts of 16,16-difluoro-3-methoxyestra-1,3,5(10)-trien-17-one in 20 parts of ethanol is added a solution of 2 parts of sodium borohydride in 3 parts of aqueous ethanol (2 parts ethanol/1 part water). The reaction mixture is stirred for about 5 minutes, diluted with water, and extracted with methylene chloride. The organic layer is dried over anhydrous sodium sulfate and evaporated to dryness to yield 16,16-difluoro-3-methoxyestra-1,3,5(10)-trien-17β-ol. This substance displays infrared maxima at 2.74, 6.22, 6.63, 10.15, and 10.32 microns.

*Example 6*

A mixture of 3.4 parts of 16,16-difluoro-3-methoxyestra-1,3,5(10)-trien-17β-ol, 50 parts of pyridine, and 40 parts of acetic anhydride is allowed to stand at room temperature for about 16 hours. Dilution of the reaction mixture with water results in formation of the crystalline product which, upon recrystallization from ether-hexane, yields pure 17β-acetoxy-16,16-difluoro-3-methoxyestra-1,3,5(10)-triene, M.P. 130–131°; $[\alpha]_D = +22°$ (chloroform).

The substitution of an equivalent quantity of propionic anhydride in the instant process results in the production of 16,16-difluoro-3-methoxy-17β-propionoxyestra-1,3,5(10)-triene.

*Example 7*

A mixture of 20 parts of 16-fluoroestrone 3-methyl ether, one part of p-toluenesulfonic acid monohydrate, and 100 parts of isopropenyl acetate is heated at reflux for about 15 hours. The mixture is distilled at reduced pressure to remove most of the unreacted isopropenyl acetate, then diluted with about 200 parts of carbon tetrachloride. This mixture is distilled at reduced pressure until about 50 parts of distillate is collected, then the cooled, stirred solution treated successively with 40 parts of anhydrous potassium carbonate and, dropwise, with a 1 molar solution of bromine in carbon tetrachloride until an intransient bromine color is obtained. This mixture is treated with aqueous sodium bisulfite, then the organic layer separated, washed with water, dried over anhydrous sodium sulfate and evaporated to dryness in vacuo. The residue is adsorbed on silica gel and eluted with benzene to yield 16α-bromo-16β-fluoroestrone 3-methyl ether.

Substitution of an equivalent quantity of a 1 molar solution of chlorine in carbon tetrachloride in the instant process affords 16α-chloro-16β-fluoroestrone 3-methyl ether.

*Example 8*

To a mixture of 0.1 part of ferric nitrate monohydrate with 2000 parts of liquid ammonia is added 11 parts of lithium portionwise. When the blue color has disappeared, acetylene is bubbled through for about 45 minutes. To this suspension is added 3.2 parts of 16,16-difluoroestrone 3-methyl ether and the mixture stirred for about 5 hours. The ammonia is allowed to evaporate and the residue treated successively with ether and saturated aqueous ammonium chloride. The organic layer is separated, washed with water, dried over anhydrous sodium sulfate, and concentrated to dryness in vacuo. The residue is adsorbed on silica gel, eluted with 80% benzene in hexane, and recrystallized from hexane, resulting in pure 17α-ethynyl-16,16-difluoro-3-methoxyestra-1,3,5(10)-trien-17β-ol, M.P. 95–98°; $[\alpha]_D = +26°$ (chloroform).

*Example 9*

A mixture of one part of 17α-ethynyl-16,16-difluoro-3-methoxyestra-1,3,5(10)-trien-17β-ol, 100 parts of ethanol, and 0.1 part of 5% palladium-on-carbon catalyst is shaken in a hydrogen atmosphere until 2 equivalents of hydrogen are absorbed. The catalyst is removed by filtration and the filtrate evaporated to dryness in vacuo. The residue is adsorbed on silica gel and eluted with 80% benzene in hexane to afford 17α-ethyl-16,16-difluoro-3-methoxyestra-1,3,5(10)-trien-17β-ol.

*Example 10*

To a mixture of 3 parts of lithium in 180 parts of ether, cooled to 0°, is added first 36 parts of methyl iodide dropwise, then one part of 16,16-difluoroestrone 3-methyl ether. The reaction mixture is stirred vigorously for about 4 hours then treated with a mixture of ice and saturated aqueous ammonium chloride. The ether layer is washed with water, dried over anhydrous sodium sulfate and concentrated to dryness in vacuo. Adsorption of the residue on silica gel followed by elution of the column with benzene-hexane mixtures affords 16,16-difluoro-3-methoxy-17α-methylestra-1,3,5(10)-trien-17β-ol.

*Example 11*

A mixture of 15 parts of 17α-ethyl-16,16-difluoro-3-methoxyestra-1,3,5(10)-trien-17β-ol, 150 parts of isopropenyl acetate, and 5 drops of concentrated sulfuric aicd is distilled slowly over a period of about 3 hours. The reaction mixture is cooled and treated with ether, then the ether solution washed successively with aqueous sodium bicarbonate and water, dried over anhydrous sodium sulfate and evaporated to dryness in vacuo. Adsorption of the residue on silica gel followed by elution with benzene results in 17β-acetoxy-17α-ethyl-16,16-difluoro-3-methoxyestra-1,3,5(10)-triene.

*Example 12*

A mixture of one part of 17α-ethyl-16,16-difluoro-3-methoxyestra-1,3,5(10)-trien-17β-ol, 10 parts of acetic anhydride, and 20 parts of pyridine is heated at reflux for about 3 hours. The reaction mixture is cooled, diluted with water, and extracted with ether. The organic layer is washed successively with aqueous sodium bicarbonate and water, dried over anhydrous magnesium sulfate, and evaporated to dryness in vacuo. The residue is adsorbed on silica gel and eluted with 2% ethyl acetate in benzene to afford 17β-acetoxy-17α-ethyl-16,16-difluoro-3-methoxyestra-1,3,5(10)-triene, which is identical with the material obtained by the procedure of Example 11.

The substitution of an equivalent quantity of propionic anhydride in the instant process affords 17α-ethyl-16,16-difluoro-3-methoxy-17β-propionoxyestra-1,3,5(10)-triene.

What is claimed is:

1. A compound of the structural formula

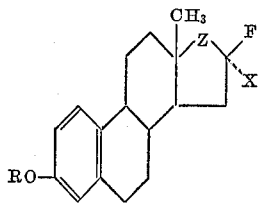

wherein R is selected from the group consisting of hydrogen, lower alkyl and lower alkanoyl radicals; X is a halogen atom having an atomic weight of less than 100; and Z is selected from the group consisting of carbonyl, β-hydroxymethylene, β-(lower alkanoyl)oxymethylene, α-(lower alkyl)-β-hydroxymethylene, and α-(lower alkyl)-β-(lower alkanoyl)oxymethylene radicals.

2. 16,16-difluoro-3-methoxyestra-1,3,5(10) - trien-17-one.

3. 16,16-difluoro-3-methoxyestra-1,3,5(10)-trien-17β-ol.

4. 17β-acetoxy-16,16-difluoro-3 - methoxyestra - 1,3,5 (10)-triene.

5. 17α-ethyl-16,16-difluoro-3-methoxyestra - 1,3,5(10)-trien-17β-ol.

6. A process for the manufacture of compounds of the structural formula

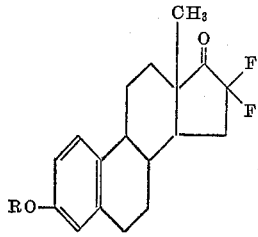

wherein R is a lower alkyl radical which comprises mixing a compound of the structural formula

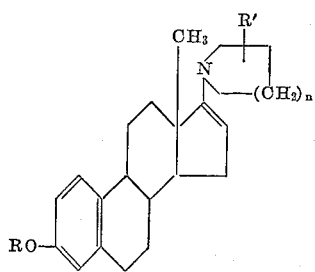

wherein n is a positive integer less than 3 and R' is selected from the group consisting of hydrogen and a methyl radical attached to the heterocyclic ring by a carbon-carbon bond, with at least two molecular equivalents of perchloryl fluoride.

7. A process for the manufacture of compounds of the structural formula

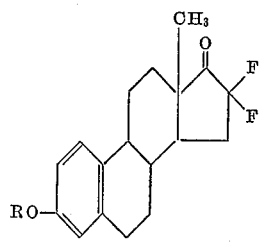

wherein R is a lower alkyl radical; which comprises mixing a compound of the structural formula

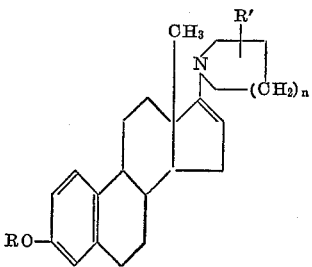

wherein n is a positive integer less than 3 and R' is selected from the group consisting of hydrogen and a methyl radical attached to the heterocyclic ring by a carbon-carbon bond, with at least 2 molecular equivalents of perchloryl fluoride in the presence of an acid acceptor.

8. A compound of the structural formula

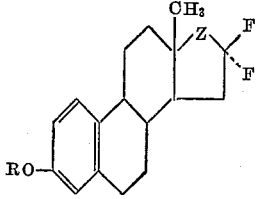

wherein Z is a member selected from the group consisting of carbonyl, α-(lower alkyl)-β-hydroxymethylene and α-lower alkyl-β-(lower alkanoyl)oxymethylene radicals and R is selected from the group consisting of H and lower alkyl.

References Cited in the file of this patent

Gubbard et al.: "Journal, Org. Chem." (1958), vol. 23, p. 1406.